United States Patent [19]

Fisher

[11] Patent Number: 4,850,813

[45] Date of Patent: Jul. 25, 1989

[54] SELF UNLOADING PUMP CIRCUIT FOR AN AUTOMATIC TRANSMISSION HAVING MULTIPLE PRESSURE SUPPLY PUMPS

[75] Inventor: Alan R. Fisher, Dearborn, Mich.

[73] Assignee: Ford Motor Company, Dearborn, Mich.

[21] Appl. No.: 164,036

[22] Filed: Mar. 4, 1988

[51] Int. Cl.⁴ .............................................. F04B 23/04
[52] U.S. Cl. ..................................... 417/288; 60/422; 60/430
[58] Field of Search ............... 417/286, 287, 288, 428, 417/402; 60/422, 430

[56] References Cited

U.S. PATENT DOCUMENTS

| | | | |
|---|---|---|---|
| 2,769,458 | 11/1956 | Misch | 137/512 |
| 3,309,939 | 3/1967 | Pierce, Jr. | 74/472 |
| 3,385,312 | 5/1968 | Kinnamon et al. | 60/422 X |
| 3,446,098 | 3/1969 | Searles | 74/869 |
| 3,692,432 | 9/1972 | Liang et al. | 417/286 |
| 3,951,575 | 4/1976 | Motomura et al. | 417/286 |
| 4,514,147 | 4/1985 | Borman et al. | 417/288 |
| 4,609,330 | 9/1986 | Fahey et al. | 417/288 |

Primary Examiner—Leonard E. Smith
Attorney, Agent, or Firm—Donald J. Harrington; Keith L. Zerschling

[57] ABSTRACT

A pump and regulator valve assembly having multiple pump and multiple regulator valve means that establish pressures of two or more operating pressure levels in a control system wherein the valve means has multiple valves that selectively respond to varying flow demands of the different regions of the control system to connect one or more pumps to reduced pressure regions when the flow demands of higher pressure regions are satisfied.

6 Claims, 13 Drawing Sheets

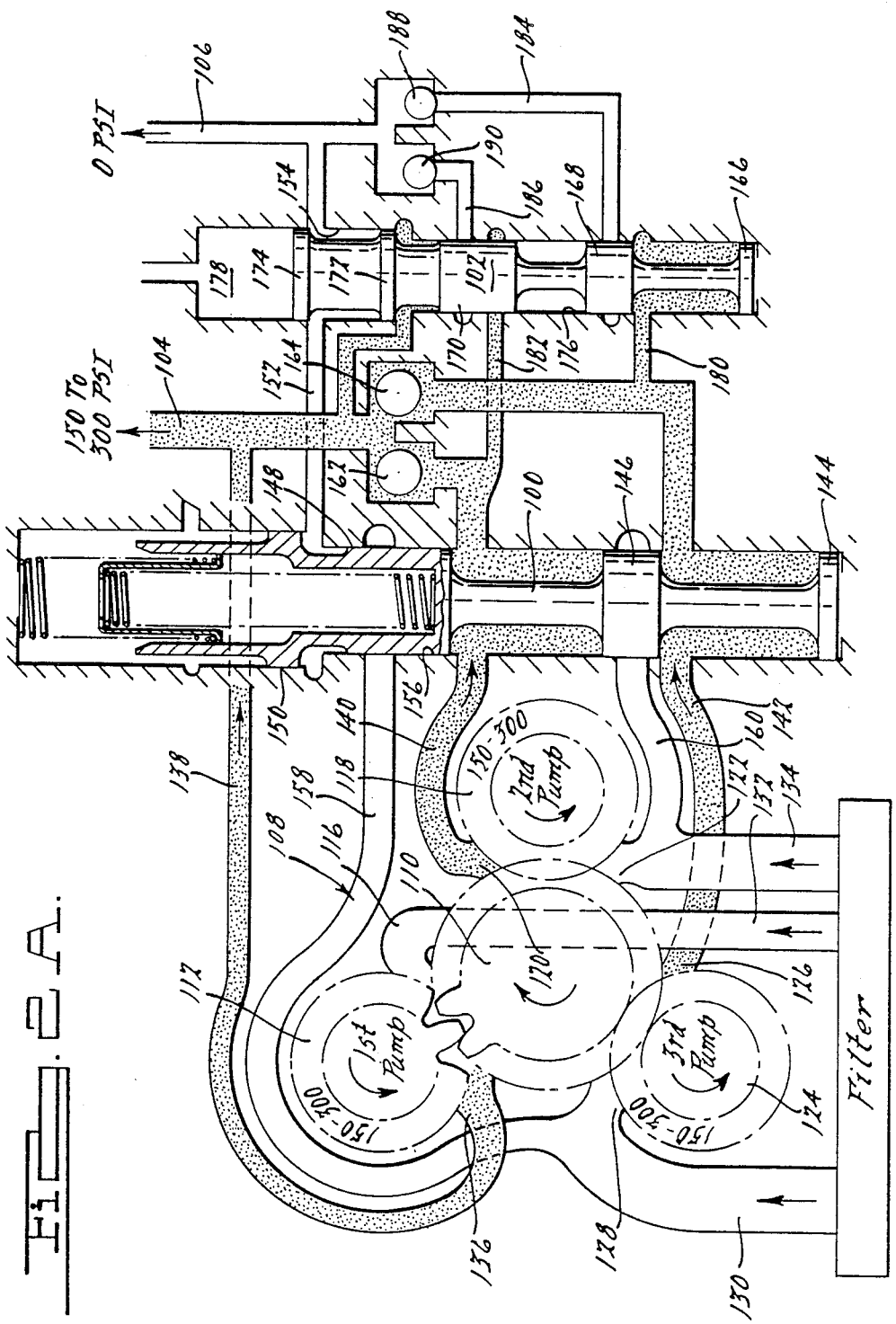

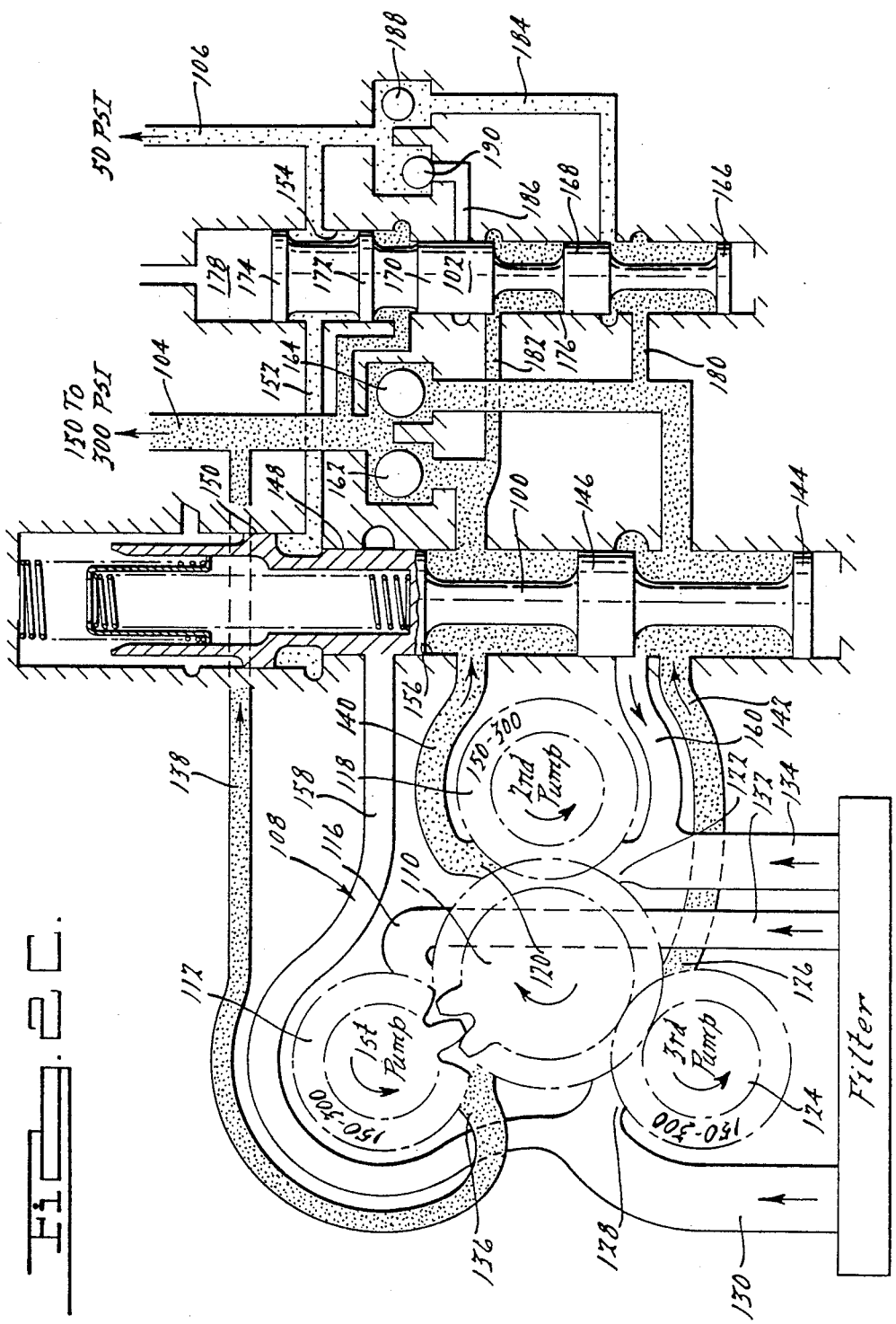

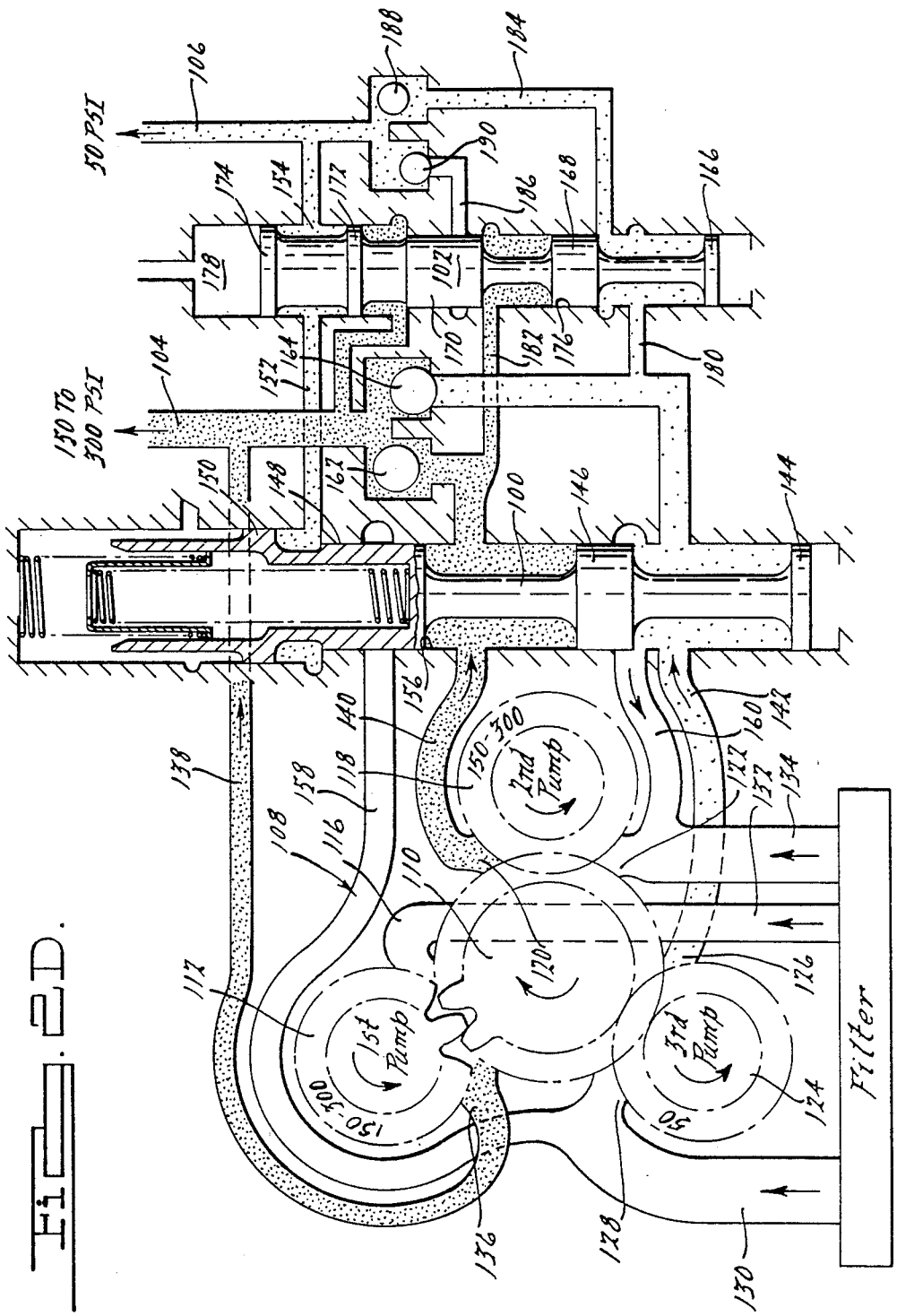

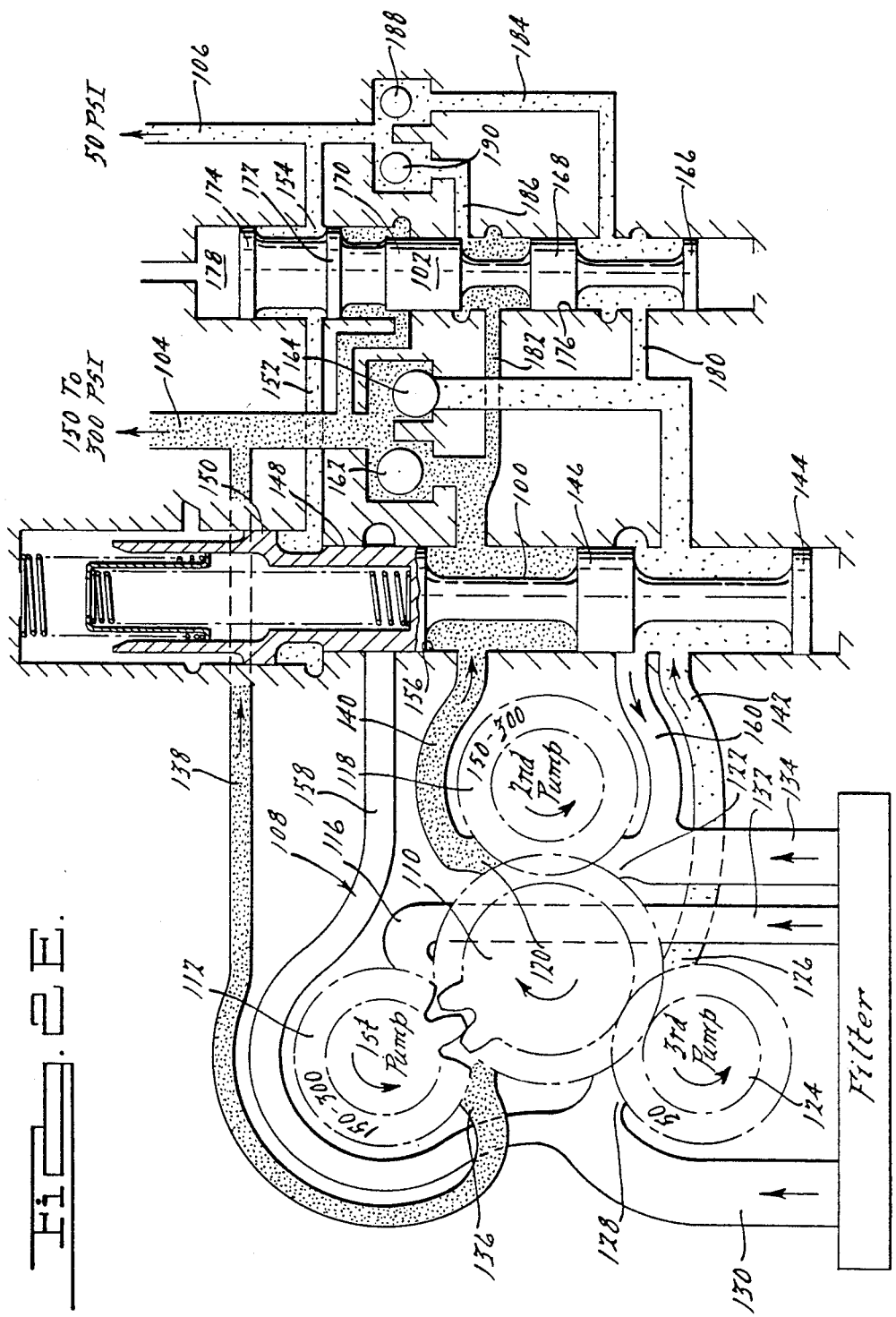

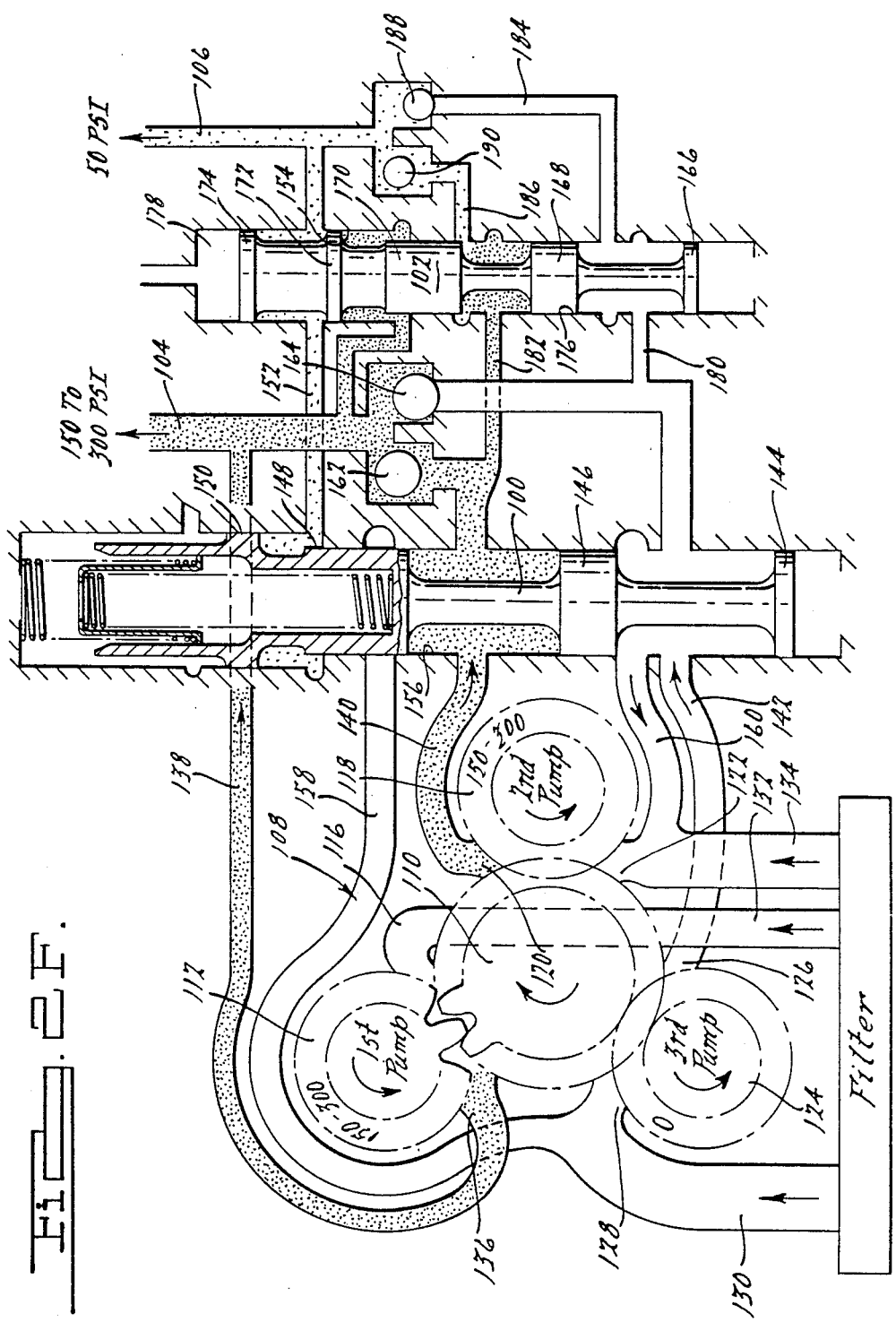

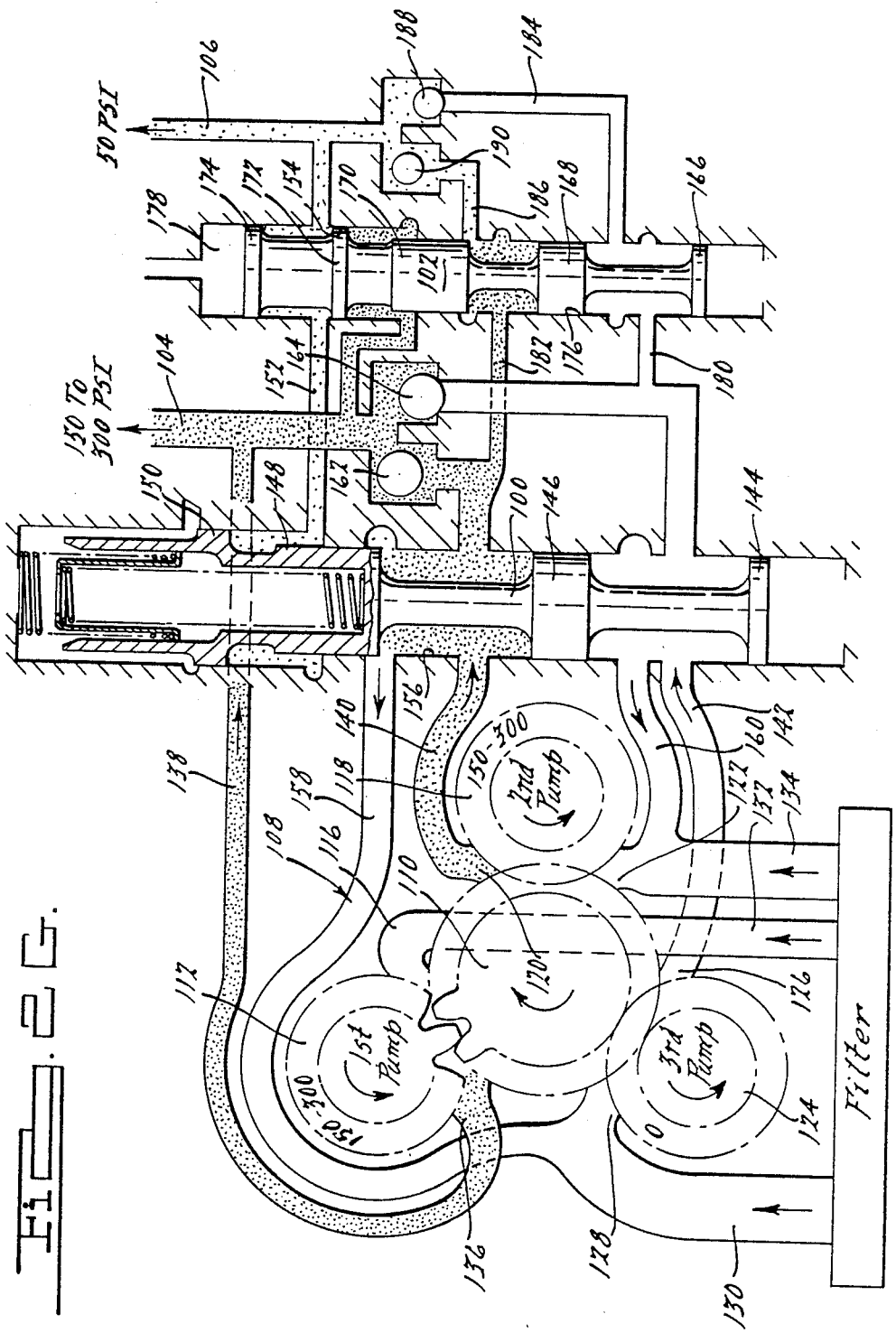

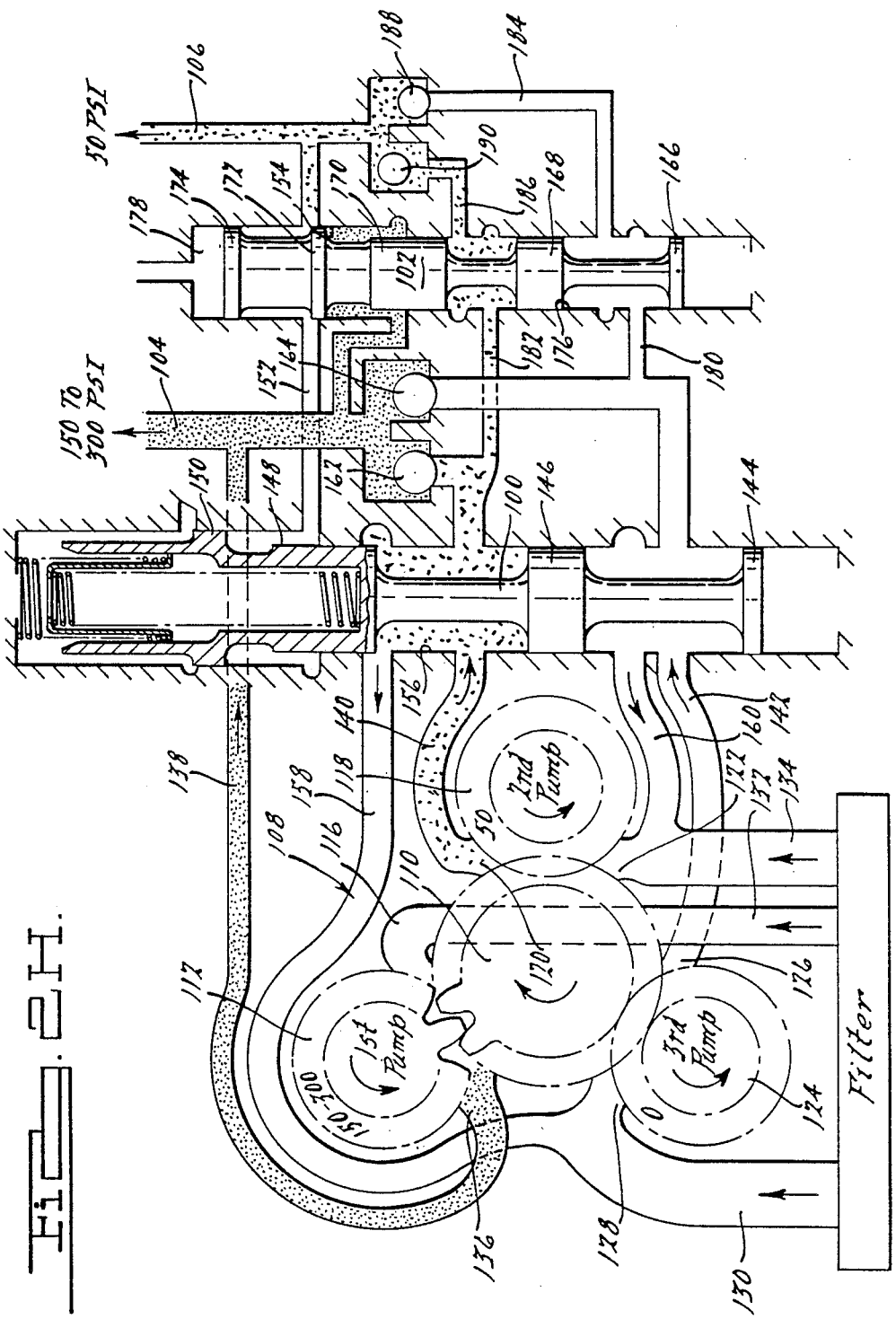

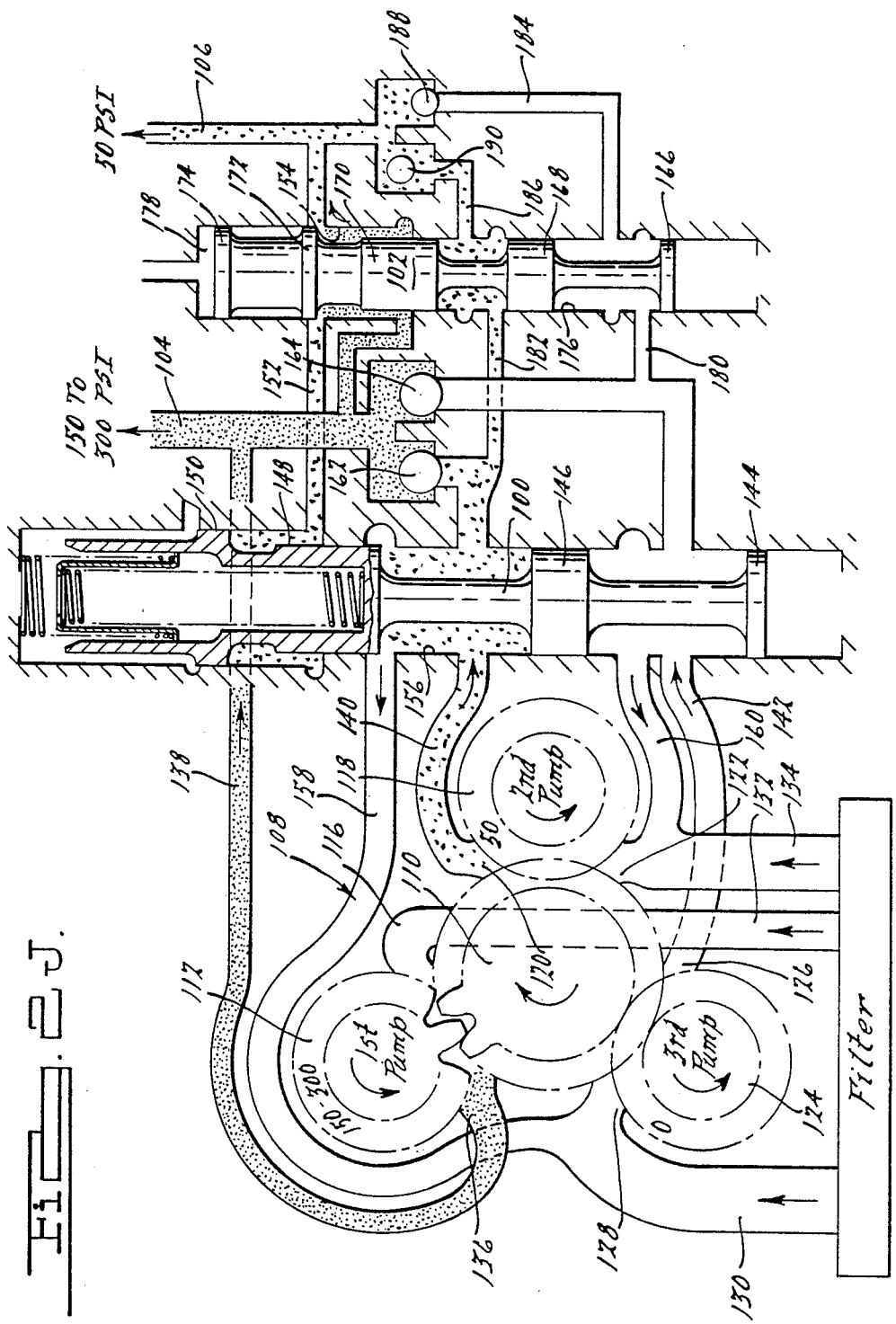

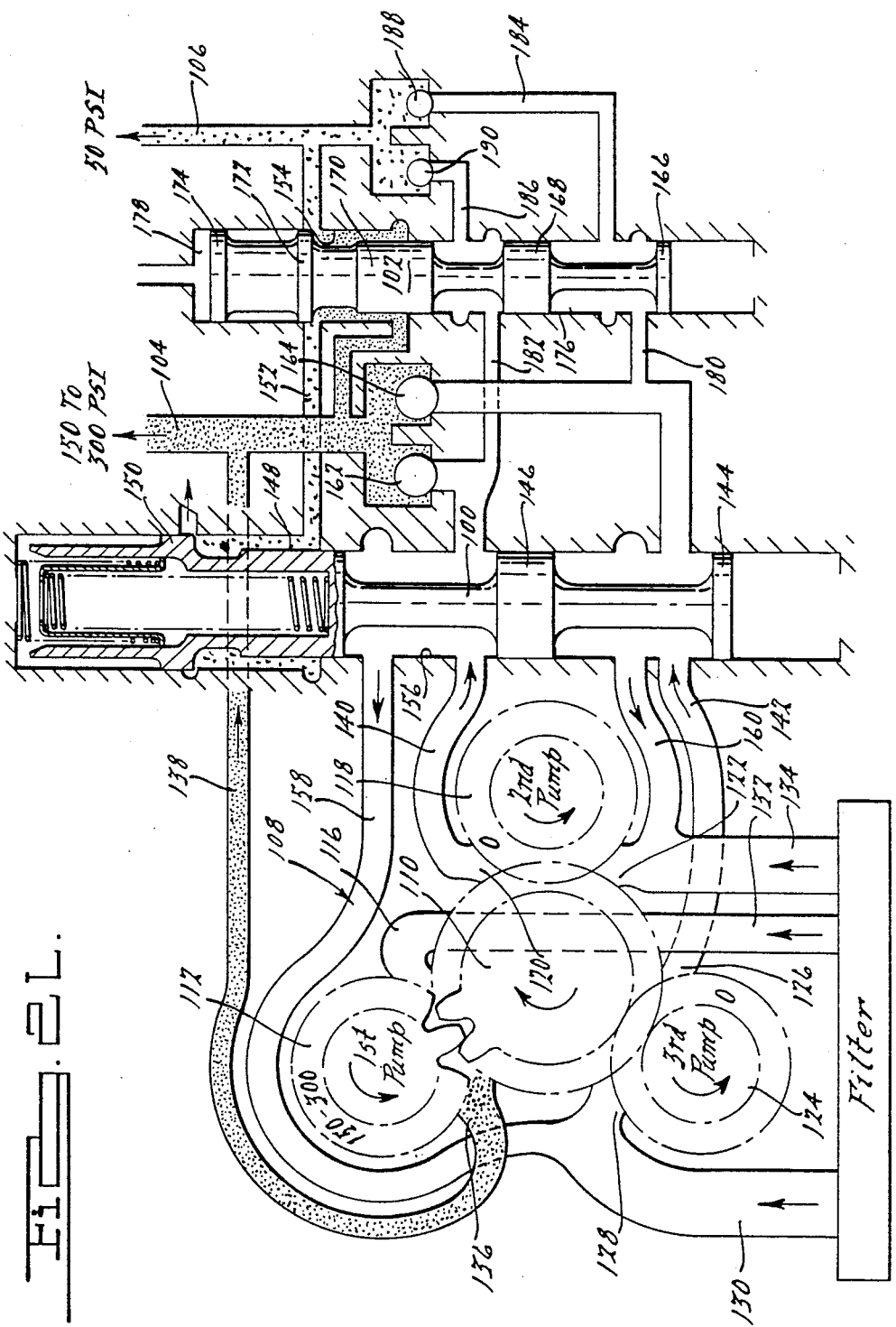

SELF UNLOADING PUMP CIRCUIT FOR AN AUTOMATIC TRANSMISSION HAVING MULTIPLE PRESSURE SUPPLY PUMPS

BACKGROUND OF THE INVENTION

Automatic power transmission mechanisms for automative vehicles presently in use usually comprise a single pressure source in a form of an engine driven pump. The pump develops a circuit pressure that is used by the control valve sytem for the automatic transmission to supply the control valve circuit pressure. A typical automatic control valve system using an engine driven pump in this manner may be seen by referring to U.S. Pat. Nos. 3,309,939 and 3,446,098, which are assigned to the assignee of this invention.

Portions of the control valve system of conventional automatic transmissions require high pressure and other portions require lower pressures. For example, the circuit pressure required to energize clutch and brake servos in an automatic transmission mechanism require high pressure, especially when the torque delivered by the transmission is at an elevated level. On the other hand, the lubrication points in the transmission, as well as the hydrokinetic torque converter, require lower pressures. The use of a single pump makes it necessary for the pump to operate at the highest pressure that is required to maintain the clutches and brakes at the necessary pressure level. Thus the pump operates with a maximum pressure differential across the pump at all engine speeds. That is, it is operated at a pressure differential across the pump that is sufficiently high to satisfy the requirements of the portion of the circuit having the greatest pressure requirement. This reduces the transmission efficiency since the maximum pressure must be maintained even though the flow needed at each particular pressure may be a small portion of the total flow.

In the case of an infinitely variable transmission employing adjustable sheaves and drive chains or belt, a high pressure is required to maintain sufficient clamping pressure on the sheaves while the other components of the circuit require lower pressures. The pump power required in such infinitely variable transmission systems, as in all transmission, equals the pressure times the volume flow rate. Thus a single fixed displacement pump is required to absorb more power from the engine than otherwise would be necessary. The same would be true with a variable displacement pump in such an environment because all of the flow from the pump is at maximum pressure.

An example of an infinitely variable transmission having a pump that distributes pressure to the clamping servos, to the ratio control servo and to the various elements of the control valve system may be seen by referring to U.S. Pat. No. 3,115,049. That patent also is assigned to the assignee of this invention.

BRIEF DESCRIPTION OF THE INVENTION

The improvements of our invention overcome the deficiencies noted in the preceding description of the prior art. That is, it is capable of minimizing the power required to drive the pump by dividing the control system into several independently operable pumps. Each pump thus can be required to develop a pressure differential different than the pressure differential that is required by a companion pump. These pumps may be separate pumps of either fixed or variable displacement and they may be operated in tandem or indenpendently, one with respect to the other. Several external gear pumps, further, may be clustered around a common driving gear driven by the engine. Alternately, a single pump such as a gerotor pump or a slipper pump having multiple inlet ports and multiple outlet ports may be used wherein the outlet ports are pressurized with different pressures simultaneously.

Our invention includes multiple pumps (for example, three independently operable pumps) which are adapted to be being driven by the vehicle engine. If three pumps are used, two separately operable regulator valves that respond to a torque signal are used in combination with a regulator valve that is calibrated to operate at a constant regulated pressure or at a variable pressure that depends upon torque. These pressure delivery passages, each having an independent maximum pressure level are supplied by the valve arrangement. During those instances in which an excess flow is required, each of the pumps contributes to the flow that is demanded by the high pressure circuit. As the flow for the circuit decreases, the excess flow is made available to the intermediate pressure level circuit. Further, if the flow decreases below the value that is demanded by the high pressure circuit and the intermediate pressure circuit, the valves respond by distributing pressure to the lowest pressure circuit portion. If the flow required of the circuit is lower than the maximum capacity of the three pumps, one of the pumps is relieved of either part or all of its pumping duties. It may operate at either a lower pressure level or at a zero pressure level. This lower pressure multiplied by the pump flow rate is a measure of the lower adjusted power demand for the pumps. If the second pump also delivers flow in excess of that which is required by the highest pressure circuit, the valves will relieve the pressure differential across the second pump and cause it to operate at either a low pressure or at a zero pressure. Thus the engine horsepower as measured by the flow of the second pump times the pressure differential across it is at a lower level than it would be if the second pump were to required to maintain a high pressure regardless of the flow requirements.

BRIEF DESCRIPTION OF THE FIGURES OF THE DRAWINGS

FIGS. 2A, 2B, 2C, 2D, 2E, 2F, 2G, 2H, 2J, 2K and 2L represent in schematic form the various operating conditions for the embodiment shown in FIG. 2. Each valve in these figures assumes the position that would be consistent with a separate operating condition of the transmission.

PARTICULAR DESCRIPTION OF THE INVENTION

For purposes of this description, reference may be use to U.S. Pat. Nos. 3,309,939 and 3,446,098, previously described, which represent a typical automatic control valve system having a single engine driven pump for supplying an automatic control valve circuit. Reference may be made also to U.S. Pat. No. 3,315,049 for a structual environment comprising an infinitely variable transmission having a ratio control sheave and a belt loading sheave, each being operated by a pressure servo. In each of these prior art patents one portion of the control system is required to maintain a high pressure and other portions, such as the lube circuit and the torque converter circuit, require lower pressures.

Unlike prior art designs our present design includes three separate pumps rather than a single pump. These pumps are illustrated schematically in FIG. 1 at 10, 12 and 14. A high pressure delivery passage 16 is connected to high pressure portions of the control system, intermediate pressure delivery passage 18 is distributed to lower pressure portions of the control system and a low pressure delivery passage is connected to the lowest pressure portions of the control system. Passage 20, for example, is connected to the lubrication circuit of a transmission of the kind shown in the '939 and the '098 patents and passage 16 is connected to a low speed ratio brake servo, which requires a relatively high circuit pressure during low speed ratio operation.

Figure 1:
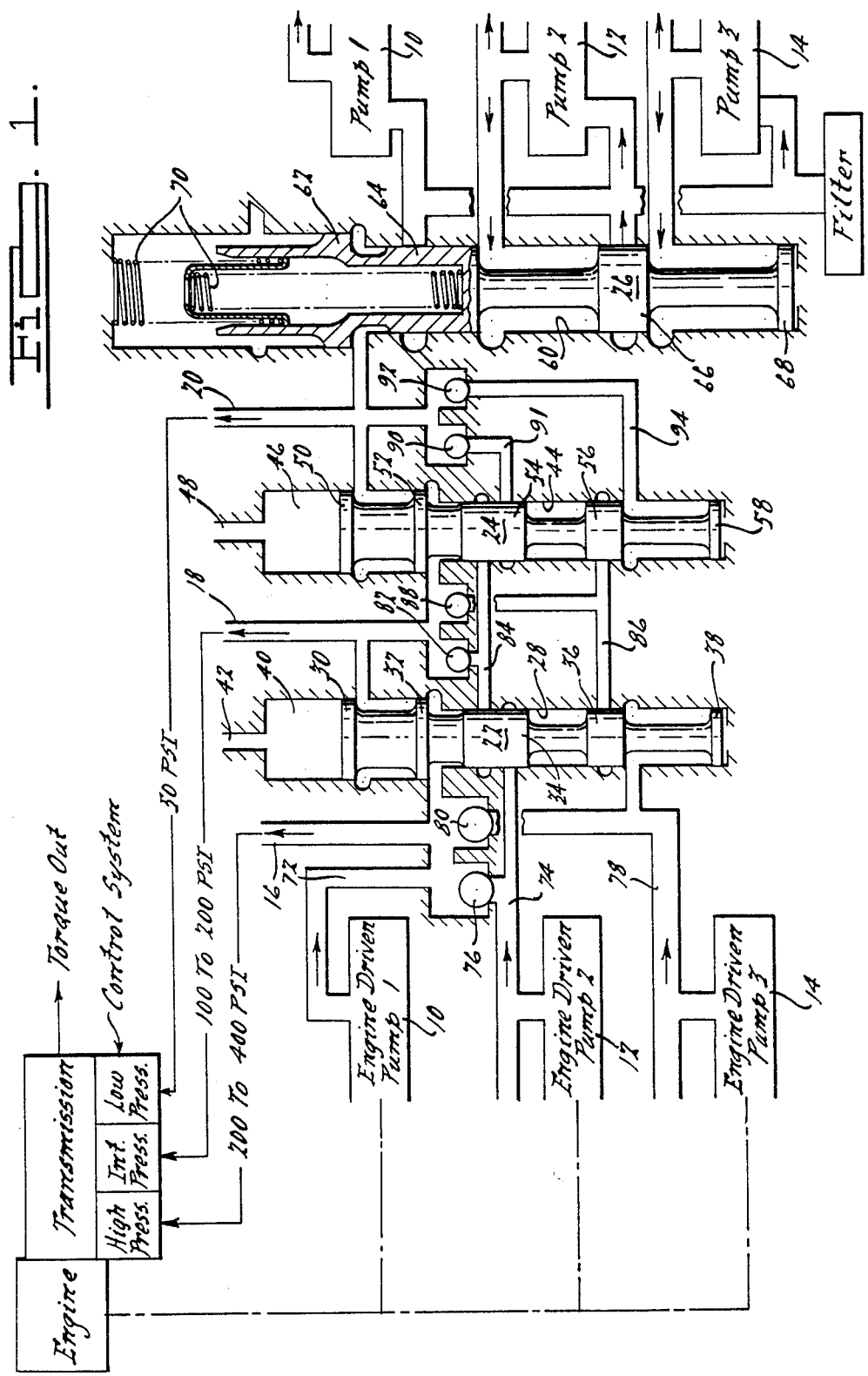
FIG. 1 is a schematic representation of a valve circuit for an automatic transmission that uses three independent pumps rather than a single pump as shown in the '939 and the '098 patents described above.

The valve circuit of FIG. 1 includes three valve spools identified separately by reference characters 22, 24 and 26. Valve spool 22 is slidably positioned in valve opening 28. It is formed with lands 30, 32, 34, 36, and 38. These lands register with internal lands formed in the valve opening 28.

The upper end of the spool 22 cooperates with the valve opening to define a pressure cavity 40 which communicates with a throttle valve pressure passage 42. This passage is connected to a throttle valve of the kind described in the '939 and '098 patents. It is a measure of engine torque.

Similarly, valve spool 24 cooperates with its valve opening 44 to define throttle valve pressure chamber 46 which receives the same throttle valve pressure through passage 48. Valve spool 24 includes valve lands 50, 52, 54, 56, and 58. These lands register with internal lands formed in the valve opening 44.

Valve spool 26 is slidably positioned in valve opening 60. It is formed with spaced valve lands 62, 64, 66 and 68. These lands register with internal lands formed in the valve opening 60. Valve spool 26 is urged in a downward direction by valve springs 70 to provide a low, fixed pressure as required for lubrication flow.

Pump 10 communicates at all times with the high pressure circuit 16, the outlet passage for the pump 10 being shown at 72. The outlet passage for the pump 12 shown at 74 communicates with a high pressure passage 16 through one way check valve 76. The third pump shown at 14 communicates through discharge passage 78 and through one way check valve 80 with the high pressure passage 16.

The outlet side of the valve spool 22 communicates with the intermediate pressure passage 18 through one way check valve 82. The discharge side of the pump 12 communicates with the passage 18 through the valve 82 if the flow requirements for the circuit connected to passage 16 do not require the full output of pump 12 or pump 14. In these circumstances spool 22 moves upwardly until land 34 uncovers the internal land connected to passage 84. Similarly, if the flow requirements of the circuit connected to passage 16 for any given throttle valve pressure do not require the full output of pump 14, land 36 moves upwardly thereby uncovering passage 86. That passage communicates with the intermediate pressure passage 18 through one way check valve 88. Upon a progressively decreasing flow requirement, pump 14 is unloaded first as valve spool 22 moves upward. Further decreases in the flow requirement result in unloading pump 12 as the valve spool 22 moves further upward.

In a similar fashion the outlet side of the valve spool 24 communicates with low pressure passage 20 through one way check valve 90 whereby the passage 84 is connected to the passage 91 when the flow requirements of passages 16, 18, and 20 require the full output of both pumps 10 and 12. The outlet side of the valve spool 24 communicates also with low pressure passage 20 through one way check valve 92 whereby passage 94 is connected to passage 86 if the full output of pump 14 is required in addition to the pumps 10 and 12 to maintain the flow requirements of passages 16, 18 and 20.

The valve spool 26 is a regulator valve that is used to unload the pumps 10, 12 and 14. It controls the flow from the discharge side of the pumps to the intake sides. In the embodiment shown, valve spool 26 maintains a constant pressure level because of the presence of the spring 70. Unlike the valve spools 20 and 24, valve spool 26 does not pass pump flow from one regulated circuit pressure level to another. Rather it bypasses flow from one side of the pump to the other. It is actuated by a pressure acting on the area differential of lands 62 and 64. That area differential corresponds to the area differential of lands 52 and 54 for the valve spool 24 and the area differential of lands 32 and 34 of the valve spool 22.

As shown in FIG. 1, when the valves are situated as shown, valve spool 22 blocks flow from each of the pumps and all of the flow from pumps 10, 12 and 14 is distributed to the high pressure passage 16. If the high pressure circuit supplied by passage 60 does not require all of the flow of the three pumps, the flow in excess of that needed causes the valve spool 22 to be raised whereby the flow from pump 14 is passed to passage 86 which communicates through check valve 88 with the intermediate pressure passage 18. Thus 14 is not required to operate with the maximum presssure differential across it. If only a portion of the output of the 14 is required by the high pressure circuit, valve spool 22 assumes a regulating position which allows only a portion of the flow from the pump 14 to pass to the passage 86. If none of the flow of pump 14 is required by the high pressure circuit connected to passage 16, valve 22 rises sufficiently to allow all of the flow of pump 14 to pass to passage 86. Check valve 80 closes because pump 3 is operating against a lower pressure differential. A lower horsepower then is required to drive it.

If the delivery of pump 12 also is in excess of that required by the high pressure circuit connected to passage 16, the valve spool 22 continues to rise thereby relieving this pump in the same manner. In the case passage 74 is brought into communication with passage 84 and the pump 12 commuicates with the intermediate circuit communicating with passage 18 through check valve 82.

Valve 24 operates in a manner similar to the mode of operation of the valve 22. It relieves pump 14 as well as pump 12 from the burden of pumping against a pressure in the intermediate pressure passage 18 if the flow in the circuit connected to passage 18 does not require all of the output flow of pump 12. If valves 22 and 24 operate against the same TV pressure, valve 24 can be provided with a greater differential area between lands 52 and 54 than the differential area of lands 32 and 32 of valve 22.

In the FIG. 1 embodiment the high pressure circuit is indicated to require a pressure of 200 to 400 PSI. The intermediate pressure circuit is indicated to require a pressure of 100 to 200 PSI and a low pressure circuit is indicated to require a pressure of 50 PSI.

Figure 2:
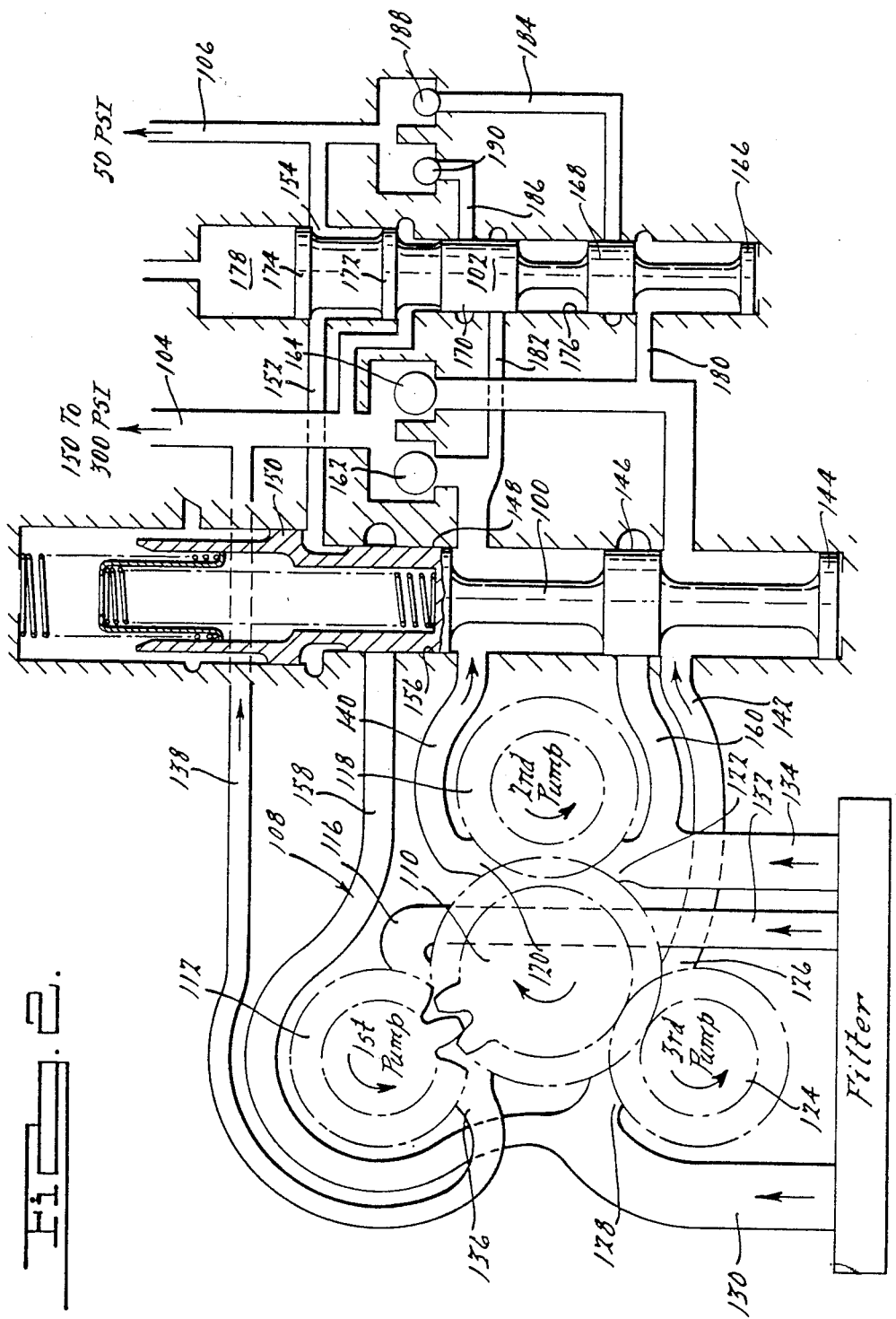
FIG. 2 is an alternate embodiment of the invention having two pressure levels rather than three wherein the multiple pumps and the torque dependent regulator valve are relocated relative to the spring loaded regulator valve.

In FIG. 2 I have shown a lower cost embodiment of the invention. It is capable of maintaining two pressure levels in discrete portions of a control circuit. In this embodiment a spring loaded valve spool 100, which corresponds to the valve spool 26 of the FIG. 1 embodiment, is located between the positive displacement pump and the companion valve spool 102.

In the FIG. 2 embodiment two pressure levels are established by the notations for the two pressure delivery passages 104 and 106. Passage 104, which is the high pressure passage, communicates with high pressure circuit regions that carry a pressure of approximately 150 to 300 PSI. Passage 106, which is the low pressure passage that communicates with lower pressure regions, may carry a pressure of approximtely 50 PSI.

In the embodiment of FIG. 2 multiple pumps having a common drive gear are located within a common pump housing 180. The common drive gear 110 geared to the engine crankshaft or driven by a pulley in the usual fashion. Gear 110 meshes with external gear 112 of a first pump. It cooperates with gear 110 to provide a positive displacement pump assembly wherein the gears 110 and 112 are driven in the direction of the directional arrows as shown in FIG. 2. A high pressure pump cavity 136 is supplied with pressurized fluid by the rotating gears, and fluid intake cavities 116 and 128 communicate with the opposite side of the fuel pump 110/112.

Gear 110 meshes also with external gear 118 of a second positive displacement pump. A high pressure cavity 120 is formed on the high pressure side of the pump defined by gears 110 and 118 and low pressure intake cavities 122 and 116 are formed on the opposite side of the second pump 110/118.

Gear 110 meshes also with external gear 124 to define a high pressure cavity 126 formed on one side of the third pump and low pressure cavities 128 and 122 are formed on the opposite side. Cavities 128 and 122 communicate with a sump and an oil filter through intake passage 130. A corresponding intake passage 132 feeds the low pressure cavity 116 of the first pump 110/112. Similarly, low pressure passage 134 feeds the low pressure cavity 122 of the second pump 110/118.

The first pump 110/112 includes a high pressure cavity 136 which communicates with high pressure passage 138. The corresponding high pressure passages for cavities 120 and 126 are shown at 140 and 142.

Valve 100 includes spaced valve lands 144, 146, 148 and 150. Lands 148 and 150 define a differential area that is subjected to the pressure in passage 152 which extends to valve chamber 154 for the valve spool 102.

Valve spool 100 is slidably positioned in valve opening 156, which is formed with internal valve lands that register with the lands 144 and 146, 148 and 150, respectively. Land 148 controls communication between the high pressure passage 140 of the second pump and flow return passage 158. Similarly, land 146 controls communication between high pressure passage 142 and flow return passage 160.

Discharge passage 138 for the first pump 110/112 communicates directly with high pressure passage 104. The high pressure passage 140 for the second pump 110/118 communicates with high pressure passage 104 through valve chamber 156 and one way check valve 162. The high pressure fluid discharge of the second pump thus supplements the fluid discharge of the first pump when the flow requirements of the high pressure portion of the circuit exceed the pumping capacity of the first pump. Similarly, high pressure passage 142 for the third pump 110/124 communicates with the high pressure passage 104 through the valve chamber 156 and through a second one way check valve 164 when the flow requirements of the high pressure portions of the circuit exceed the pumping capacity of the first pump 110/112 and the second pump.

The valve spool 102 has multiple lands 166, 168, 170, 172 and 174. Lands 170 and 172 define a differential area that is subjected to the pressure in passage 104.

Valve spool 102 is slidably positioned in valve chamber 176 which has internal lands that register with the external lands of the valve spool 102. The upper end of the valve chamber 176 defines a throttle valve pressure chamber 178. A torque signal in the form of throttle pressure creates a force that opposes the force of the pressure on the differential area of lands 170 and 172.

Passage 180 connects the valve chamber 176 with valve chamber 156 adjacent land 168, and passage 182 connects valve chamber 156 with valve chamber 176 adjacent land 170. Land 168 controls communication between passage 180 and passage 184 while land 170 controls communication between passage 182 and passage 186. One way fluid check valves 188 and 190 establish communication between passage 184 and 186 respectively and passage 106.

If the flow requirements of the high pressure circuit are less than the capacity of the three pumps, valve spool 102 will be shifted upwardly thereby connecting the third pump 110/124 to the low pressure circuit through passages 180 and 184 and the one way check valve 188. If the flow requirements of the low pressure circuit and the high pressure circuit are such that they are satisfied by only the first pump and the second pump, valve spool 100 will be shifted upwardly thereby opening passage 160 to passage 142. Thus the third pump 110/124 operates against a zero pressure head. Valve spool 102 moves upwardly to establish communication between the second pump and the low pressure circuit through passage 182, 186 and check valve 190.

The two pressure level system of FIG. 2 is adaptable for a continuously variable transmission having adjustable sheaves and a drive belt. The requirements of the system and the capacity of the pumps can be tailored by adjusting the displacements of the pumps. This can be done by altering as appropriate the outside diameters of the driven gears of the first and second pumps and making the inside diameters of the pump cavities proportionately smaller or larger as the case may be. Also the pump gears can be offset radially, one relative to the other. to provide an out-of-mesh driving condition thereby establishing a smaller displacement per revolution for each of the pumps as appropriate.

For the purpose of clarifying the mode of operation of the embodiment of FIG. 2, reference may be made to the schematic diagrams of FIGS 2A through 2L. As shown in FIG. 2A the engine drives each of the three pumps, and each of the three pumps is subjected to maximum line pressure as all of the output flow of the three pumps is distributed to the high pressure ciucuit. In this instance the valve spool 102 is in a downward position. Both check valves 162 and 164 are open.

Valve spool 102 interrupts communication between the pumps and the low presssure circuit. Thus the high pressure circuit has priority.

In FIGS. 2A through 2L common reference characters are used. Each pressurized portion of the circuit is shown in appropriate discrete shading while the exhausted portions of the circuit are shown with no shading. The shading for the low pressure is lighter than the shading for the high pressure.

Figure 2B:
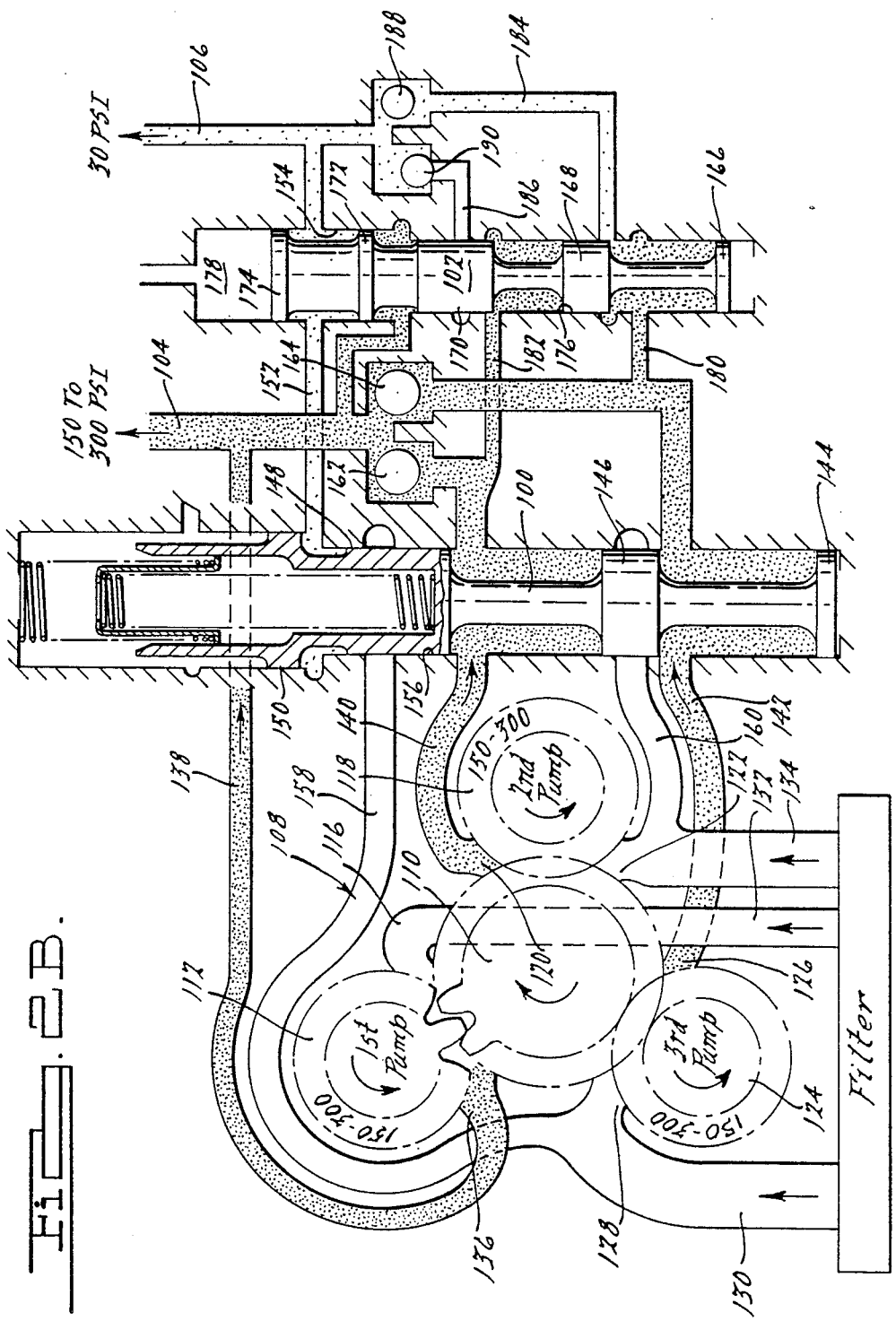

In the embodiment of FIG. 2B, the flow requirement of the high pressure circuit does not demand all of the output of the three pumps. In this instance valve spool 102 is moved in an upward direction and begins to regulate. Check valve 188 in FIG. 2B is open thereby allowing a portion of the fluid pumped by the three pumps to enter the low pressure portion of the control system. The right hand valve regulates thus allowing a pressure to be maintained in the low pressure control system portion that is greater than zero but less than the maximum pressure level for that portion. The balance of the flow of the third pump as well as all the flow of the first and second pumps is distributed through the check valves 162 and 164 to the high pressure passage 104.

As seen in FIG. 2C the flow requirement of the high pressure portion of the control system is reduced further thereby allowing all of the flow of the third pump to be distributed through the right hand regulator valve to the low pressure portion of the control system. Again check valve 188 is open under these conditions. As in the case of FIG. 2B, the control valve system in the condition shown in FIG. 2C allows maximum circuit pressure to be distributed to the high pressure portion of the control system through the check valves 162 and 164.

In FIG. 2D the valves are in the position corresponding to a further reduction in the flow requirements of the high pressure control system portion. The right hand regulator valve moves upwardly thereby allowing full communication between the third pump and the low pressure portion of the control system through check valve 188. Check valve 164 is closed thereby isolating the low pressure circuit from the high pressure circuit. The third pump, since it operates against a lower pressure head, requires less horsepower than in the case of the condition shown in FIG. 2A, FIG. 2B or FIG. 2C, respectively.

In the condition shown in FIG. 2E the flow requirements of the low pressure portion of the circuit are partially supplied by the second pump as the regulator valve on the third right again assumes a regulating position. This requires both check valves 190 and 188 to be opened. The flow of the third pump that is not required to satisfy the requirements of the low pressure portions of the control system is bypassed across land 146 of the left regulator valve to the supply side of the pumps.

In the embodiment of FIG. 2F the flow requirements of the low pressure portion of the circuit are such that all of the flow from the third pump is bypassed since the capacity of the first pump and the second pump are sufficient to meet the flow requirements of both the high pressure portion and the low pressure portion of the control system. Thus the pressure drop across the third pump is zero, further reducing the horsepower required to drive the pumps. Check valve 188 is closed while check valve 190 remains open.

In FIG. 2G the flow requirements are reduced still further to a point where the left regulator valve begins to regulate, thus causing partial return flow to the intake sides of the pumps across land 148. In FIG. 2H the valves are in the position corresponding to a condition in which only a part of the output of the second pump is required to maintain the maximum circuit pressure in the control system and the upper limiting pressure of the low pressure portion of the control system. In this instance both check valves 162 and 164 are closed. A portion of the output of the second pump is routed to the low pressure portion of the control system through check valve 190. The pressure differential across the second pump now is low thereby further reducing the pumping horsepower.

In FIG. 2J the two circuit pressure levels are maintained as in the case of FIG. 2H with part of the flow to the low pressure portion of the control system supplied by passage 152 across land 172.

Figure 2K:
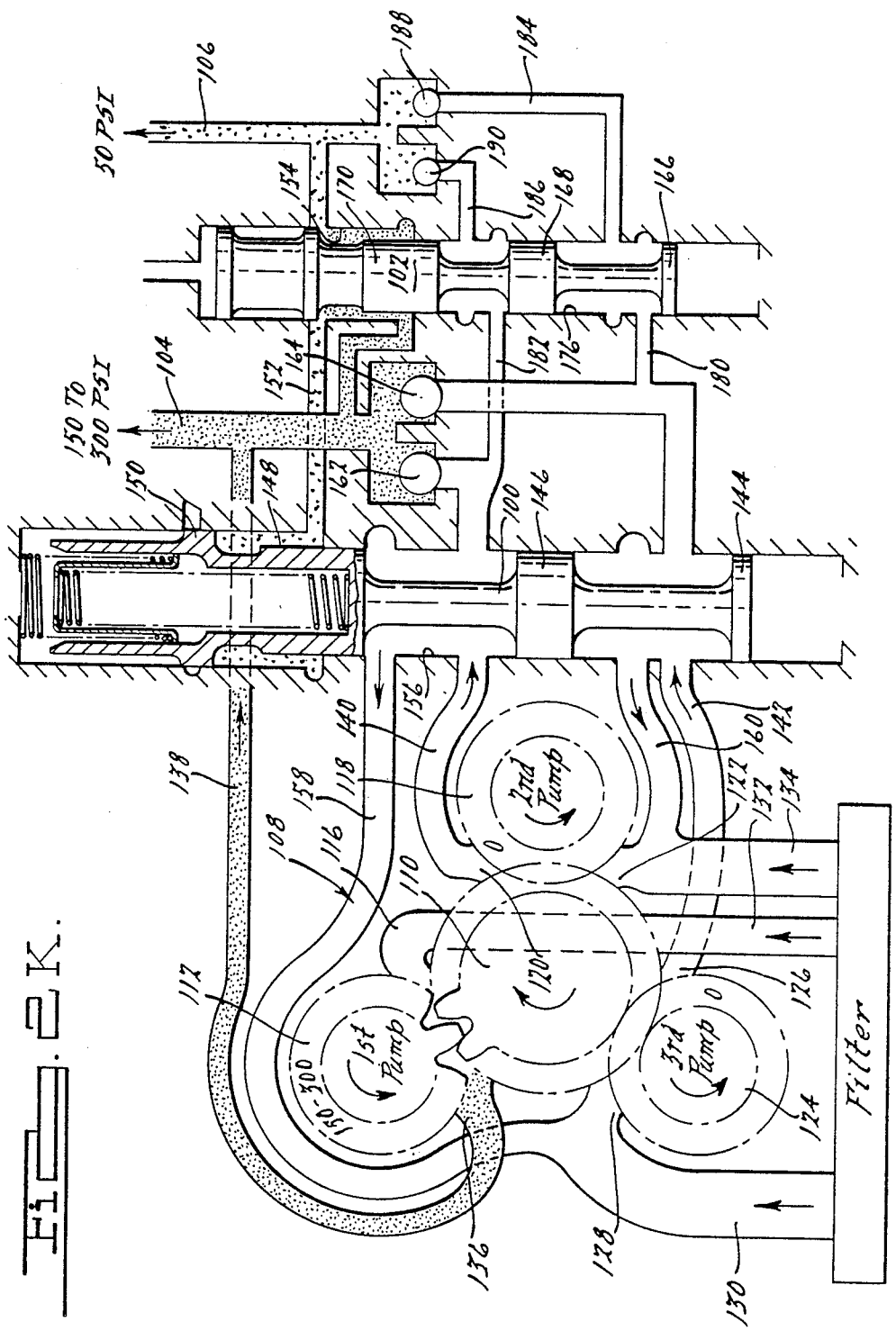

In FIG. 2K the valves are positioned so that the regulator valve on the left bypasses flow across the second pump as well as across the third pump thereby creating a zero pressure differential across these two pumps while all of the circuit pressure for both levels of the control system is maintained by the first pump. All of the check valves in this case are closed as direct communication is established between the outlet side of the first pump and the high pressure passage 104. The right hand valve regulates the pressure supplied to it through passage 152 to maintain reduced pressure in passage 106.

If the flow requirements of the control system are reduced still further, the left hand regulating valve is moved to its extreme upper position thereby exhausting excess fluid through the exhaust port in the spring chamber for the left regulating valve. This condition is illustrated in FIG. 22.

Having thus described preferred embodiments of my invention, what I claim and desire to secure by U.S. Letters Patent is:

1. A pressure supply valve means for establishing multiple regulated circuit pressure levels in a control system comprising:

multiple positive displacement pumps, a first of said pumps being adapted to be connected to a portion of said control system having a pressure level;

a first regulator valve means between a control system portion containing a second and a third of said pumps and a portion of said control system having a low pressure level;

a first-one-way check valve means between said second pump and said high pressure portion and a second one-way check valve means between a third of said pumps and said high pressure portion;

said first regualtor valve means being adapted to selectively establish communication between said second and third pumps and said low pressure portions as the flow requirement of said high pressure portion decreases; and second regulator valve means between the high and low pressure sides of said pumps and responding to the pressure in said low pressure portion to selectively connect said second and third pumps to their inlet sides as the flow requirements of said high and low pressure portions decrease.

2. The combination as set forth in claim 1 wherein said control system includes third and fourth one-way check valves between said first regualtor valve means and said low pressure portion for selectively distributing fluid flow from said second and third pumps to said low pressure portions and for isolating said second and third pumps from said low pressure portion when the flow capacity of said first pump is sufficient to meet the flow requirements of said control system.

3. The combination as set forth in claim 1 wherein said first, second and third pumps are gear pumps with a common drive gear, each pump having a driven gear meshing with said common gear, the gears of said pumps thereby defining a compact pump assembly.

4. The combination as set forth in claim 2 wherein said first, second and third pumps are gear pumps with a common drive gear, each pump having a driven gear meshing with said common gear, the gears of said pumps thereby defining a compact pump assembly.

5. The conbination as set forth in claim 1 wherein said second regualtor valve means is located between said pumps and said first regulator valve means thereby providing a compact pump and valve assembly.

6. The combination as set forth in claim 2 wherein said second regulator valve means is located between said pumps and said first regulator valve means thereby providing a compact pump and valve assembly.

* * * * *